United States Patent [19]

White et al.

[11] 4,168,763

[45] Sep. 25, 1979

[54] SOUND SUPPRESSOR APPARATUS

[75] Inventors: Pritchard H. White, Santa Monica; Eugene C. De Young, Upland, both of Calif.

[73] Assignee: E. C. De Young, Inc., Riverside, Calif.

[21] Appl. No.: 883,070

[22] Filed: Mar. 3, 1978

[51] Int. Cl.² .................. B64D 33/06; B64F 1/26
[52] U.S. Cl. .................................. 181/218; 181/220; 181/222
[58] Field of Search .............. 181/203, 213, 214, 217, 181/218, 220, 221, 259, 262, 222; 239/127.3, 265.17; 138/38; 60/317, 324

[56] References Cited

U.S. PATENT DOCUMENTS 2,926,743  3/1960  Melchior .......................... 181/251
2,930,405  3/1960  Welsh ................................. 138/38
3,151,701  10/1964  Duthion et al. ................... 181/217

Primary Examiner—L. T. Hix
Assistant Examiner—Benjamin R. Fuller
Attorney, Agent, or Firm—Knobbe, Martens, Olson, Hubbard & Bear

[57] ABSTRACT

A ring of tubes extends inwardly from a noise suppressor housing wall sufficiently far to impinge upon the periphery of the high velocity core of a supersonic jet exhaust to disrupt the core and reduce the sound power generated. A large volume of outside cooling air is induced by jet pump action into the suppressor; and a portion of this cooling air is ducted through the tubes and into the exhaust stream to maintain the temperature of the tubes below an acceptable level to prevent their premature destruction.

1 Claim, 3 Drawing Figures

SOUND SUPPRESSOR APPARATUS

This invention relates to a sound suppression system for the exhaust of a jet engine during ground run-up and particularly to a completely air cooled system which can handle a high temperature, supersonic jet stream.

In the maintenance and ground testing of after-burning jet aircraft engines, it is necessary to operate the engines at levels which produce a high temperature, supersonic exhaust stream. It is usual practice to direct the engine exhaust into a structure which will suppress the tremendous noise which is developed. One way of accomplishing this is to insert an obstruction in the high velocity core which will disrupt the stream sufficiently to reduce the noise level. However, a major problem with this approach is that the temperature of the core of the exhaust stream is so high that most acceptable materials cannot tolerate the heat. One approach used to resolve this problem has been to cool the obstruction in the engine exhaust sufficiently by circulating large quantities of water through the structure and/or injecting water into the jet stream.

There is a number of drawbacks to this approach. A primary one is that large quantities of water are wasted; and in many sections of the country there are restrictions or limitations on the amount of water available. Perhaps more importantly, the vaporization of this water reduces the combustion of the exhaust gases with the result that an undersirable combination of steam and partially burnt fuel escapes into the atmosphere. In many areas of the country this result is environmentally unacceptable. Utilizing air to cool the engine exhaust and improve combustion represents an enticing solution to this problem, and a number of prior art patents disclose sound suppressors utilizing air to reduce the temperature of an engine exhaust and obtain some sound reductions. However, these systems have apparently been unable to effectively handle the high temperature super sonic exhausts of afterburning jet engines and the water cooled systems continue to be the only ones available. Accordingly, a need exists for a completely air-cooled sound suppressor which is both effective and practical.

In accordance with the present invention, the engine exhaust is directed through a tubular housing. The structure of the noise reducing obstruction extends from adjacent to the housing wall into the interior of the housing sufficinetly far to be in the path of the high velocity, high temperature core region of the supersonic jet stream. This structure disrupts the flow of the jet stream core enough to change its character, reduce its velocity and hence its noise. To prevent the structure from being quickly destroyed by heat, large volumes of cooling air are directed through the structure. In addition to cooling the structure, this added air further promotes sound reduction and yet permits the continued combustion of unburned exhaust gases. Consequently, the gases leaving the sound suppressor are much more environmentally acceptable by contrast with the steam laden water-cooled sound suppressor exhausts.

In the preferred form of the invention, the structure disrupting the core is in the form of a plurality of tubes which extend axially adjacent to the inner wall of the housing and then extend radially inwardly and rearwardly to penetrate the core of the exhaust. A tubular liner is positioned within the housing spaced inwardly from the housing wall with the tubes being located in the annular space between the liner and the housing wall. The forward end of the housing and the liner have outwardly flaring frusto/conical inlet sections which define an annular space of frusto/conical shape leading to the space between the tubular liner and housing wall. The housing is located such that the inlet sections are positioned immediately downstream from the exit plane of the engine. In this way large quantities of air are induced by the high velocity jet exhaust stream through the inlet sections into the housing and into the space between the liner and the housing wall. Guide walls are positioned longitudinally in the annular space between the inlet sections to direct the induced air flow that enters the annular space, so that all of such air flow must pass through the plurality of tubes that extend into the jet core. By this design, a relatively large volume of cooling air is directed through the tubes, with the result that the portions of the tubes directly in the hottest part of the engine exhaust can be maintained at an acceptable temperature level. A large volume of cooling air is also induced by the jet stream directly into the overall housing inward of the housing liner; this air further helps to maintain the temperature of the structure at an acceptable level. Those portions of the tubes extending into the hottest area are preferably formed of stainless steel and are preferably formed with a plurality of ribs on their interior to enhance heat transfer between the tubes and the cooling flow within them.

For a more thorough understanding of the invention refer now to the following detailed description and drawings in which.

Figure 1:
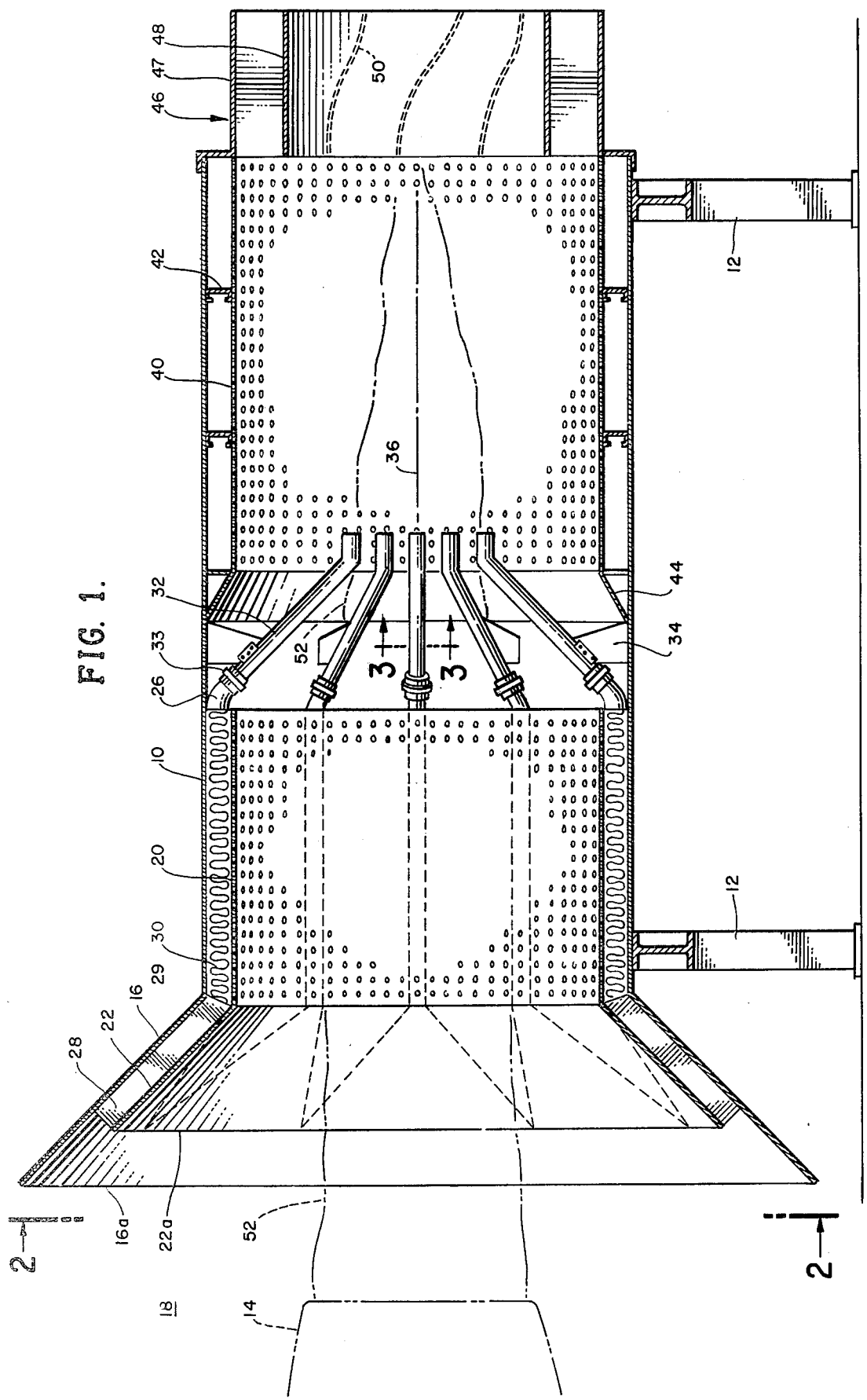
FIG. 1 is a cross-sectional view of a preferred form of the sound suppressor system of the invention.
Figure 2:
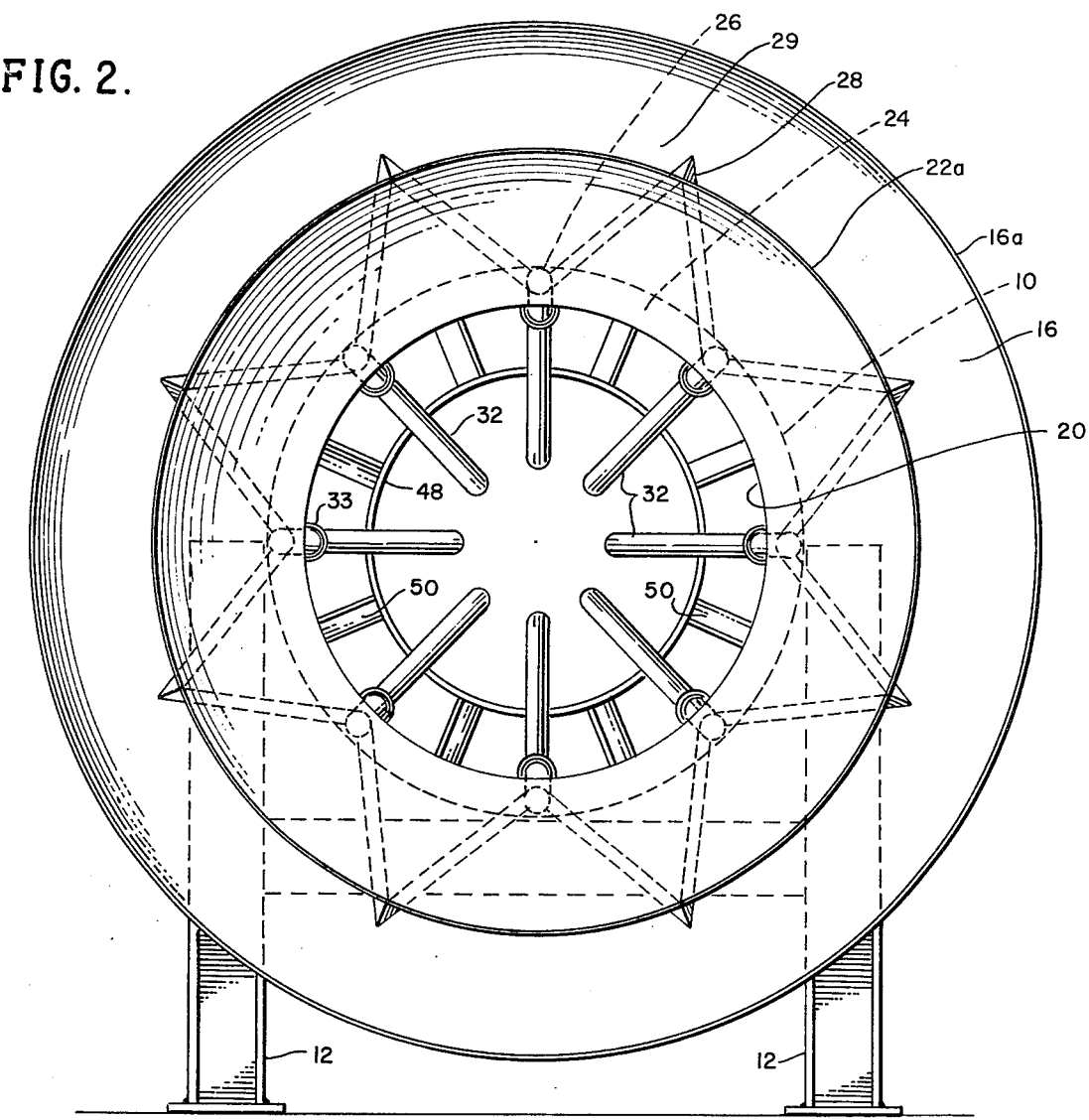
FIG. 2 is an end view looking downstream from the front end of the suppressor.

Referring to FIGS. 1 and 2, the sound suppressor may be seen to include an elongated exterior housing 10 supported on suitable legs 12 at a height to be axially positioned downstream from the end of a jet engine, as schematically illustrated at 14. Attached to the forward end of the housing 10 is an enlarged inlet section 16 having a frusto/conical shape tapering outwardly and forwardly to provide an enlarged mouth leading to the housing. As can be seen from FIG. 1, the diameter of the housing 10 is larger than the diameter of the exit of the engine 14, and the outer diameter of the forward end 16a of the inlet section 16 is much larger than the engine. In the illustration shown, the housing diameter is approximately three times the diameter of the engine. It may also be seen that the inlet edge 16a of the suppressor is spaced downstream from the engine 14. Thus, a large diameter annular space 18 is created between the exit of the engine 14 and the forward edge 16a of the inlet section 16.

Spaced inwardly from the housing 10 is a cylindrical liner 20 at the forward end of the housing, covering approximately a little more than a third of the housing length. Attached to the forward end of the liner 20 is an outwardly and forwardly flaring, frusto/conical inlet liner section 22 that extends parallel to the inlet section 16. Positioned in the annular space 24 defined by the housing 10 and the liner 20 are axially extending tubes 26, with the forward ends of the tubes 26 opening to the annular space between the inlet section 16 and the inlet liner section 22. Within this annular space there are positioned a plurality of guide walls 28 that direct incoming air flow into the tubes 26. As may be seen from FIG. 2, the guide walls 28 create generally triangular shaped, funnel-like passages 29 formed by sections of the annular walls 22 and 16 and by the guide walls 28. The entrance to each passage extends circumferentially approximately 45 degrees and tapers to the diameter of a tube 26.

Between each of the tubes 26 in the annular space 24 there is positioned sound absorbing material 30 which forms both a sound insulating and heat insulating function. The liner 20 is preferably formed of perforated material and hence, also enhances a sound absorbing function.

As can be seen from FIG. 1, the downstream ends of the tubes 26 are curved slightly to extend inwardly and rearwardly. Attached to the end of each tube 26 by a suitable coupling 33 is a tubular extension 32 supported from the housing 10 by a rib 34. The tubular extensions 32 extend inwardly and rearwardly to a point about two-thirds the distance towards the longitudinal axis 36 of the housing 10. The downstream ends of the tubular extensions 32 are bent to extend parallel to the axis 36. As seen from FIG. 2, the tubes form a circle having a diameter about one-fourth that of the diameter of the housing 10. In the ideal case, the circle diameter would be approximately one-half of the engine diameter. The tubular extensions 32 are preferably made of stainless steel to withstand the temperatures that occur during use of the suppressor.

The rear half of the tubular housing 10 has a second acoustic liner 40 spaced inwardly from the outer housing wall 10 by a plurality of suitable supports 42. As may be seen from FIG. 1, the liner is also formed of perforated material. An annular shield 44 extends from the forward end of the liner 40 at an angle towards the housing wall 10 to direct the flow of gases through the liner. The aft liner achieves acoustic absorbtion through non-linear effects due to high flow velocity and intense sound field.

Positioned at the downstream end of the housing is an annular mixing structure 46 commonly referred to as a "Schwartz swirl". This swirl includes inner and outer spaced cylindrical walls 47 and 48 joined by a plurality of circumferentially spaced vanes 50.

In operation of the suppressor of the invention, a jet engine 14 is positioned approximately as shown in FIG. 1 spaced forwardly from the forward edge 16a of the inlet to the suppressor, and with the axis of the engine aligned approximately with the axis of the suppressor. The suppressor is particularly adapted for handling supersonic jet exhausts. As is well known, the exhaust stream includes a central elongated conically shaped core which is schematically illustrated at 52 in FIG. 1. It is this core which is the hottest part of the exhaust and attains the highest velocity. A typical maximum temperature in such a core is about 3,000 degrees F. The tubular extensions 32 extend partially into the core to provide an obstruction which disrupts the flow, reducing the speed of the gases to subsonic levels. This greatly reduces the noise level. However, stainless steel will melt at about 2,500° F. To prevent the tubular extensions from melting, the temperature should be kept much below that temperature. Consequently, it is necessary that sufficient cooling be provided.

The construction of the suppressor accomplishes this through a combination of factors. First, the design of the inlet section in its positioning with respect to the engine exhaust causes a large volume of exterior air to be drawn into the suppressor by jet pump action. That is, the high speed exhaust induces a large volume of air to be sucked or drawn into the suppressor through the space 18. A certain percentage of this air flows into the central portion of the suppressor within the inlet liner section 22. This air largely flows along the interior of the liner 20, mixing with the portion of the exhaust that flows in that area. This air helps maintain the temperature of the liner 20 and the outer portions of the tubular extensions 32 at an acceptable level. The gradual mixing with the hot exhaust not only produces a reduction in temperature but also helps reduce the sound level. Furthermore, this additional air promotes combustion of any unburned gases in the exhaust stream. This air, however, does not sufficiently penetrate the core of the exhaust to reduce the speed of the gases in the core to subsonic level. It is the tubular extensions 32 forming an obstruction in the core which causes this action. The induced air flowing through the central portion of the suppressor mixes with the disrupted core gases to help reduce the sound levels.

Figure 3:
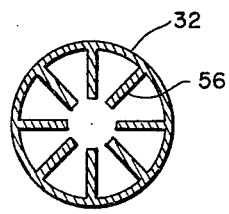
FIG. 3 is a cross-sectional view of one of the sound suppressor tubes on the line 3—3 of FIG. 1.

The remainder of the induced air entering the suppressor flows into the annular space between the inlet 16 and the inlet liner 22 and is directed by the guide walls 28 into the tubes 26, from which it flows through the tubular extensions 32 and into the exhaust stream. It is this flow of air which conducts heat away from the tubular extensions 32 that is largely responsible for keeping the tubes sufficiently cool. The air exiting from the tubes of course mixes with the remainder of the exhaust and further promotes reduction of temperature and sound and enhances complete combustion. As seen from FIG. 3, the tubular extensions 32 are formed with a plurality of inwardly extending ribs or fins 56 which facilitate heat transfer from the metal to the cooling air.

Due to the unique inlet arrangement the volume of air ducted through the tubes 26 is much larger than it would be if the tubes were simply exposed directly in an induced airflow without the funneling effect of the inlet which of course, increases the cooling capacity.

The exhaust downstream from the tubular extensions is further mixed with the induced air and the sound levels are further reduced by the acoustical liner 40 and the "Schwartz swirl". If desired, additional sound reducing structure may be added at the end of the unit.

What is claimed is:

1. A jet engine sound suppressor comprising:
   an elongated tubular housing for receiving the engine exhaust;
   an outwardly and forwardly flaring inlet portion attached to the forward end of said housing, larger than the exhaust stream, for receiving and directing exterior air into the forward end of said housing;
   a tubular liner positioned in the forward portion of said housing spaced radially inwardly from the housing to define an annular space;
   a plurality of tubes positioned in said space extending generally parallel to the axis of the housing and being widely spaced circumferentially from each other;
   an outwardly and forwardly flaring inlet liner attached to the forward end of said housing liner and spaced inwardly from the surrounding housing inlet portion;
   guide walls extending between said housing inlet portion and said inlet liner dividing the space between said liner and said inlet portion into a series of wide-mouthed, funnel-like passages, each of which converges into the forward end of a respective one of said tubes for directing air into said tubes while greatly increasing the velocity of the air as it passes through said passages;

a plurality of tube extensions each connected to the rear of a respective one of said tubes and extending inwardly and rearwardly into the interior of the housing to enter the high velocity core of a supersonic jet stream to disrupt the exhaust stream and reduce the noise of the exhaust stream, the temperature of said tube extensions being kept at an acceptable level by the air flowing through said tubes and tube extensions.

* * * * *